United States Patent [19]

Hoshino et al.

[11] Patent Number: 5,094,998

[45] Date of Patent: Mar. 10, 1992

[54] FINE-PARTICLE AGGREGATE EMULSION

[75] Inventors: Futoshi Hoshino, Tokyo; Makoto Nakano; Takeshi Yanagihara, both of Kanagawa, all of Japan

[73] Assignee: Mitsui Toatsu Chemicals, Incorporated, Tokyo, Japan

[21] Appl. No.: 599,969

[22] Filed: Oct. 19, 1990

Related U.S. Application Data

[62] Division of Ser. No. 352,304, May 16, 1989, Pat. No. 4,978,695.

[30] Foreign Application Priority Data

May 16, 1988 [JP] Japan .................................. 63-117098
Aug. 10, 1988 [JP] Japan .................................. 63-198051

[51] Int. Cl.$^5$ .......................... B41M 5/30; B41M 5/36; B41M 5/40
[52] U.S. Cl. ................................... 503/207; 427/152; 503/200; 503/226

[58] Field of Search ................ 427/152; 503/200, 207, 503/226

[56] References Cited

U.S. PATENT DOCUMENTS

4,427,836  1/1984  Kowalski et al. ................... 525/301
4,904,635  2/1990  Tamagawa et al. ................. 503/207

*Primary Examiner*—Pamela R. Schwartz
*Attorney, Agent, or Firm*—Millen, White & Zelano

[57] ABSTRACT

Disclosed in a fine-particle aggregate emulsion comprising aggregate particles formed from a copolymer (a) composed of an unsaturated carboxylic acid and a vinyl monomer copolymerizable therewith, and a foreign polymer (b) formed by polymerization of a vinyl monomer differing in composition from that used in copolymer (a), foreign polymer (b) being present in the form of particles having a diameter of 0.05 to 0.5 $\mu$, the aggregate particles having a diameter of 0.2 to 3.0 $\mu$.

This fine-particle aggregate emulsion is useful in paints, paper coating and information recording paper.

19 Claims, No Drawings

FINE-PARTICLE AGGREGATE EMULSION

This is a division of parent application Ser. No. 07/352,304, filed May 16, 1989, now U.S. Pat. No. 4,978,695.

BACKGROUND OF THE INVENTION a) Field of the Invention

This invention relates to a fine-particle aggregate emulsion useful as an additive for coating compositions used as paints and in paper coating and information recording paper, as well as a process for producing the same.

b) Description of the Prior Art

In recent years, various particulate polymers have been being studied in order to develop organic pigments useful as additives for coating compositions.

The most commonly used particulate polymer is homogeneous, emulsion-polymerized polystyrene particles having a diameter of 0.2 to 0.5μ. For example, Japanese Patent Laid-Open No. 59741/'84 discloses a process wherein an unsaturated carboxylic acid and a vinyl monomer are copolymerized in the presence of an anionic surface active agent and/or a nonionic surface active agent to form a copolymer emulsion in which more than 90% of the particles have a diameter of 0.20 to 0.28μ. It is also described therein that this copolymer emulsion can be used in applications including paper coating, paints and the like. However, the organic pigment produced by this process comprises particles having a uniform composition throughout, so that it fails to provide sufficient hiding power and brightness. Accordingly, no practical advantage is obtained unless it is used in large amounts.

In recent years, an organic pigment composed of particle having pores, unlike homogeneous and solid particle, has been proposed in order to further improve hiding power and brightness (U.S. Pat. No. 4,427,836). This patent discloses a process for producing aqueous dispersion which comprises providing a dispersion of core particles formed from a polymer containing at least 5% of a carboxylic acid monomer, adding thereto at least one monoethylenically unsaturated sheath monomer for forming a sheath polymer, subjecting this monomer to emulsion polymerization, and neutralizing the resulting emulsion with an aqueous volatile base to swell the core particles and thereby form minute openings therein.

When the organic pigment produced by this process is used in paints or paper coating compositions, an improvement in hiding power and brightness is achieved as compared with the use of organic pigments composed of homogeneous and solid particles. However, this organic pigment has the disadvantage that, according to the usage, its pores may be destroyed to cause a loss in hiding power and brightness. The pores are destroyed by freezing, some solvents used in paint formulations, and heating. Thus, this organic pigment can be used only under limitations on formulation and usage.

SUMMARY OF THE INVENTION

It is a first object of the present invention to provide a fine-particle aggregate emulsion which, when used in paints, paper coating, information recording paper and the like, can meet the requirements concerning such properties as hiding power, brightness and gloss, and can be used stably because of little limitation on formulation and usage.

It is a second object of the present invention to provide a highly sensitive thermal recording material which, when used in the field of thermal recording as an application field of the aforesaid fine-particle aggregate emulsion, can respond to the speeding-up of information devices and can produce dense and clear images.

The first object of the present invention has been accomplished by finding the fact that a particulate polymer is highly suitable for use as an organic pigment when it has a particle structure in which two different polymeric components exist inhomogeneously in each particle and one of the polymeric components forms an aggregate of finer particles in each particle.

Thus, the present invention provides a fine-particle aggregate emulsion comprising aggregate particles formed from 0.5 to 90 parts by weight of a copolymer (a) composed of 1 to 50 parts by weight of an unsaturated carboxylic acid and 99 to 50 parts by weight of a vinyl monomer copolymerizable therewith, and 99.5 to 10 parts by weight of a another polymer (b) formed by polymerization of a vinyl monomer differing in composition from that used in copolymer (a), foreign polymer (b) being present in the form of particles having a diameter of 0.05 to 0.5μ, the aggregate particles having a diameter of 0.2 to 3.0μ.

The fine-particle aggregate emulsion having the above-described particle structure can be produced by a process comprising the first step of forming a copolymer (a) by emulsion polymerization of 1 to 50 parts by weight of an unsaturated carboxylic acid and 99 to 50 parts by weight of a vinyl monomer copolymerizable therewith, and neutralizing the resulting copolymer emulsion with an alkaline substance in an amount of 0.3 to 3.0 moles per mole of the carboxylic acid used therein; and the second step of adding to the neutralized emulsion a vinyl monomer differing in composition from that used in copolymer (a), in an amount of 99.5 to 10 parts by weight for 0.5 to 90 parts by weight of the solid component of the neutralized emulsion, and subjecting the resulting mixture to emulsion polymerization while using the neutralized emulsion as seed particles.

The above-described second object of the present invention is accomplished by providing a thermal recording material comprising a substrate and a color developing layer containing a color former and a developer capable of producing a color by contact therewith, characterized in that an undercoating layer containing the particles of a fine-particle aggregate emulsion is disposed between the substrate and the color developing layer.

DETAILED DESCRIPTION OF THE INVENTION

In producing the fine-particle aggregate emulsion of the present invention, copolymer (a) formed from an unsaturated carboxylic acid and a vinyl monomer needs to be swollen by neutralization with alkali. The desired particles each comprising an aggregate of finer particles can be obtained only by adding to the copolymer emulsion a vinyl monomer differing from that used in copolymer (a) and optionally containing a crosslinkable monomer, and then subjecting it to emulsion polymerization in the presence of the swollen particles of copolymer (a).

An example of the unsaturated carboxylic acid used in the present invention is one or more compounds selected from unsaturated monobasic acids such as acrylic acid, methacrylic acid and crotonic acid; unsaturated dibasic acids such as itaconic acid, fumaric acid and maleic acid; and monoesters of the foregoing acids. Among others, acrylic acid and methacrylic acid are preferred.

This unsaturated carboxylic acid is used in an amount of 1 to 50 parts by weight, preferably 2 to 20 parts by weight and more preferably 5 to 15 parts by weight, per 100 parts by weight of the total monomers used in copolymer (a). If the amount is less than 1 part by weight, the emulsion particles will not be fully swollen by alkali and, therefore, there will not be obtained any particles comprising aggregates of finer particles. If the amount is greater than 50 parts by weight, the resulting particle will be poor in water resistance and alkali resistance.

An example of the vinyl monomer copolymerizable with the above-defined unsaturated carboxylic acid, which also becomes a constituent of copolymer (a), is a compound selected from aromatic vinyl compounds such as styrene, α-methylstyrene and vinyltoluene; (meth)acrylic esters such as methyl (meth)acrylate, ethyl (meth)acrylate and butyl (meth)acrylate; vinyl esters such as vinyl acetate and vinyl propionate; vinyl cyano compounds such as (meth)acrylonitrile; halogenated vinyl compounds such as vinyl chloride and vinylidene chloride; and the like. If desired, functional monomers such as (meth)acrylamide, N-methylol(meth)acrylamide, 2-hydroxyethyl (meth)acrylate and glycidyl (meth)acrylate may be used in addition to the unsaturated carboxylic acid.

Copolymer (a) needs to be totally swollen during neutralization. To this end, the aforesaid monomers should preferably be selected and combined so that the glass transition temperature of copolymer (a) will be 90° C. or below and more preferably 70° C. or below.

In order to control the degree of swelling of the emulsion particles during neutralization with alkali, a crosslinkable monomer as described later may be present in copolymer (a) according to the need. This crosslinkable monomer can be used in an amount of not greater than 20 parts by weight and preferably not greater than 10 parts by weight. Its proper amount varies according to the type and amount of unsaturated carboxylic acid used, the type of vinyl monomer used, and the like.

The alkaline substance used to swell the emulsion particles can be a compound selected from inorganic alkaline substances such as potassium hydroxide, sodium hydroxide, calcium hydroxide and sodium silicate; volatile alkaline substances such as ammonia; and organic alkaline substances such as dimethylethanolamine, triethylamine, triethanolamine and morpholine.

The degree of neutralization is such that the alkaline substance is preferably used in an amount of 0.3 to 3.0 moles, more preferably 0.5 to 2.0 moles, per mole of the unsaturated carboxylic acid used in copolymer (a). If the amount of alkaline substance used is less than 0.3 mole, the degree of swelling by an alkaline substance will be so low that the desired particles cannot be obtained. If it is greater than 3.0 moles, the resulting organic pigment will not be suitable for practical use because of its unduly high pH and poor water resistance.

The preparation of copolymer (a) serving as seed particles is carried out according to conventional emulsion polymerization techniques. The surface active agent used for this purpose can an anionic surface active agent, a nonionic surface active agent or a combination thereof.

Useful anionic surface active agents include, for example, sodium alkylbenzenesulfonate, sodium alkylsulfate, sodium dialkylsulfosuccinate and naphthalenesulfonic acid-formalin condensate. Useful nonionic surface active agents include, for example, polyoxyethylene alkyl ether, polyoxyethylene alkylphenol ether, ethylene oxide-propylene oxide block copolymer and sorbitan fatty acid ester.

Although the amount of surface active agent used is not critical, it is usually used in an amount of about 0.1 to 10 parts by weight per 100 parts by weight of all monomers.

As the polymerization initiator, there may be used any of various polymerization initiators that are commonly used in emulsion polymerization. Useful polymerization initiators include, for example, persulfates such as potassium persulfate, sodium persulfate and ammonium persulfate; organic peroxides such benzoyl hydroperoxide; and azo compounds such as azobisisobutyronitrile. If desired, they can also be used as redox initiators by combining them with a reducing agent.

In the preparation of seed particles, polymerization is carried out by adding the several monomers dropwise, at a time, in portions or continuously, to a reaction medium containing the aforesaid polymerization initiator and surface active agent. This polymerization is usually carried out at a temperature of 20° to 90° C. under an atmosphere of nitrogen.

The copolymer emulsion thus obtained is neutralized with an alkaline material as described previously. Then, a second step is carried out by using the neutralized emulsion as seed particles. Specifically, a vinyl monomer differing in composition from that present in copolymer (a) and optionally containing a crosslinkable monomer is added to the neutralized emulsion and subjected to emulsion polymerization so as to form an aggregate emulsion in which each particle contains a number of finer particles of another polymer (b). The vinyl monomer optionally containing a crosslinkable monomer is used in an amount of 10 to 99.5 parts by weight, preferably 40 to 95 parts by weight, more preferably 60–57 parts by weight, and most preferably 70–95 parts by weight, for 0.5 to 90 parts by weight of the solid component of the neutralized emulsion.

The optionally used crosslinkable monomer is a monomer having two or more polymerizable unsaturated bonds in the molecule. Useful crosslinkable monomers include, for example, divinylbenzene, ethylene glycol dimethacrylate, trimethylolpropane trimethacrylate, ethylene glycol diacrylate, 1,3-butylene glycol dimethacrylate and diallyl phthalate.

Where the aforesaid crosslinkable monomer is used, its amount is not greater than 20 parts by weight, preferably not greater than 10 parts by weight, per 100 parts by weight of the vinyl monomer. Use of the crosslinkable monomer brings about an improvement in blocking resistance, thermal resistance and solvent resistance. However, if its amount exceeds 20 parts by weight, a large amount of agglomerates will be formed because of unsuccessful polymerization.

Useful vinyl monomers include, for example, aromatic vinyl compounds such as styrene, α-methylstyrene and vinyltoluene; (meth)acrylic esters such as methyl (meth)acrylate, ethyl (meth)acrylate and butyl (meth)acrylate; vinyl esters such as vinyl acetate and vinyl propionate; vinyl cyano compounds such as (meth)acrylonitrile; halogenated vinyl compounds such as vinyl chloride and vinylidene chloride; and conjugated diene compounds such as butadiene.

In order to impart various stabilizing properties such as mechanical stability and miscibility to the emulsion, one or more other functional monomers may also be used in addition to the unsaturated carboxylic acid used in copolymer (a). For this purpose, functional monomers commonly used in emulsion polymerization, such as (meth)acrylamide, N-methylol(meth)acrylamide, 2-hydroxyethyl (meth)acrylate and glycidyl (meth)acrylate, can be used alone or in combination The glass transition temperature of another polymer (b) obtained by using the above-described combination of monomers in the second step is preferably 50° C. or above and more preferably 70° C. or above. To this end, styrene, methyl methacrylate or acrylonitrile is preferably used either alone or in combination with other monomers.

The composition of copolymer (a) formed from an unsaturated carboxylic acid and a vinyl monomer must be different from that of foreign polymer (b) optionally containing a crosslinkable monomer. If they have the same composition, aggregate particles having the desired structure will not be obtained and the resulting emulsion, when used as an organic pigment, will fail to provide sufficient brightness and hiding power. The preferred compositions are such that the refractive index of copolymer (a) formed from an unsaturated carboxylic acid and a vinyl monomer is different from that of another polymer (b) optionally containing a crosslinkable monomer and, moreover, these polymeric components are subject to phase separation because of their poor compatibility.

In the second step, polymerization can be carried out in the following manner: After the copolymer emulsion formed by copolymerization of an unsaturated carboxylic acid and a vinyl monomer in the first step is swollen by neutralization with an alkaline material, a vinyl monomer optionally containing a crosslinkable monomer, either as such or in the form of an emulsion, is added thereto at a time, in portions or continuously and subjected to emulsion polymerization. On this occasion, the polymerization conditions must be chosen so that no new particles will be formed.

The particulate polymer thus obtained comprises fine-particle aggregates formed from a mixture of a copolymer (a) composed of an unsaturated carboxylic acid and a vinyl monomer copolymerizable therewith, and a another polymer (b) differing in composition from copolymer (a) and optionally containing a crosslinkable monomer, and characterized in that polymeric compounds (a) and (b) exist inhomogeneously in each aggregate particle, the aggregate particles formed from polymeric component (a) and (b) have a diameter of 0.2 to 3.0μ, and the particles of another polymer (b) present in the aggregate particles have a diameter of 0.05 to 0.5μ.

If the diameter of the particles formed from polymeric components (a) and (b) is smaller than 0.2μ, the resulting emulsion will fail to provide sufficient hiding power and brightness, while if it is larger than 3.0μ, the resulting emulsion will be poor in hiding power, brightness, gloss and printing gloss. If the particle diameter of another polymer (b) present in the aggregate particles is smaller than 0.05μ, the resulting emulsion will fail to provide sufficient hiding power and brightness, while if it is larger than 0.5, fine-particle aggregates cannot be obtained consistently.

The particle diameter of another polymer (b) present in the aggregate particles can be controlled by varying the amount of carboxylic acid present in the seed particles of copolymer (a), the degree of neutralization of the carboxylic acid, the amount of initiator used for polymerization, the degree of crosslinking of another polymer (b), and the like. For example, the particle diameter of foreign polymer (b) becomes larger as the amount of carboxylic acid present in the seed particles is decreased. The diameter of the aggregate particles themselves can be readily controlled by varying the diameter of the seed particles.

No particular limitation is placed on the form in which copolymer (a) exists. For example, where the amount of copolymer (a) is greater than that of another polymer (b), copolymer (a) exists as a continuous phase and foreign polymer (b) exists as particles dispersed therein. Where the amount of copolymer (a) is less than that of another polymer (b), copolymer (a) exists between the particles of another polymer (b) and this is a preferred form.

The fine-particle aggregate emulsion thus obtained is characterized in that the whole particle consists of an aggregate of finer particles. In this respect, this emulsion is substantially different from the confetti particle emulsion produced by the conventional process for forming confetti particles by phase separation (see, for example, "A Collection of Papers on KOBUNSHI", 33, 575, 1976), because these confetti particles are formed by polymerization of the monomer only at or near the surface of the particles.

Another process for forming fine-particle aggregates is also known. According to this process, an agglomerate emulsion is produced by secondary agglomeration techniques such as blending of particles having opposite electric charges, salting-out of particles, and the like. However, it is difficult to produce a uniform agglomerate emulsion having a limited particle size distribution according to this process. In contrast, the fine-particle aggregate emulsion of the present invention is characterized by a very limited particle size distribution, on the basis of the unique features of the polymerization method.

When used as a pigment or filler for paints and paper coating colors, the fine-particle aggregate emulsion of the present invention can provide excellent hiding power, brightness, gloss, water resistance and the like owing to its morphological features. Moreover, since there are few limiting conditions concerning its formulation and usage, the fine-particle aggregate emulsion of the present invention can be used stably in the commonly employed range of amounts. In these applications, titanium dioxide, kaolin clay and calcium carbonate can be wholly or partially replaced by the fine-particle aggregate emulsion of the present invention.

In addition, the fine-particle aggregate emulsion of the present invention is effective in saving weight and improving blocking resistance, hardness, abrasion resistance, thermal resistance and the like. Accordingly, it can be used as an additive for various compositions and applied to paper, metals, alkaline materials, plastics, fibers, cloth and the like.

UTILIZATION OF THE FINE-PARTICLE AGGREGATE EMULSION

As described above, the fine-particle aggregate emulsion of the present invention can be used in paints, paper coating, information recording paper and the like. Now, its use in thermal recording materials is specifically described hereinbelow.

The fine-particle aggregate emulsion of the present invention can be utilized for the manufacture of thermal recording materials for use in information devices such as facsimile receivers, printers, data communication equipment and computer terminal equipment, and more particularly for the manufacture of highly sensitive thermal recording materials responding to the speeding-up of information devices such as facsimile receivers.

Conventionally, thermal recording materials are made by dispersing a color former (i.e., a colorless or light-colored leuco dye) and a developer (i.e., a phenolic compound such as bisphenol A) into a binder, applying this dispersion to a substrate such as paper, and then drying it. The thermal recording materials thus obtained develop a color by heating with a thermal head or a thermal pen, and thus permit easy recording of images. Accordingly, they are being used in wide applications including information devices (such as facsimile receivers, thermal printers, data communication equipment and computer terminal equipment), labels, tickets, commutation tickets and the like.

Especially with the speeding-up of information devices, it is highly desired that the thermal recording materials used therefor are also adaptable to high-speed recording.

One method for increasing the recording speed is to elevate the temperature of the thermal head and thereby improve the color developing sensitivity. However, the elevated temperature of the thermal head tends to develop such troubles as build-up of foreign matter, sticking and the like. Moreover, the service life of the thermal head becomes too short for practical purposes.

Where paper is used as the substrate, the direct application of a fluid for forming a thermal recording layer to the paper is disadvantageous because the fluid permeate into the paper and, therefore, the amount of color developing components present on the paper surface becomes insufficient to give an adequate color density. In order to overcome this disadvantage, Japanese Patent Laid-Open No. 86789/'80 discloses a method for producing dense and clear images by forming an intermediate layer containing fine particles of a synthetic resin between the substrate and the thermal recording layer. However, this method has not always succeeded in providing sufficiently high sensitivity to be fit for the desired high-speed recording.

In order to solve the above-described problem, it is conceivable to dispose a heat-insulating undercoating layer between the substrate and the thermal recording layer. This undercoating layer is believed to be effective in preventing the transfer of heat from the thermal head to the substrate, thus enhancing the color developing sensitivity and providing high-speed recording capability. It seems that such heat insulating properties can be obtained by making the undercoating layer porous. As a means for accomplishing this purpose, the present inventor has attempted to use various forms of fine particles as fillers and has found that color developing sensitivity can be markedly improved by using a fine-particle aggregate emulsion comprising porous aggregate particles.

From a morphological point of view, the particles contained in the fine-particle aggregate emulsion of the present invention are porous, in themselves. This can be confirmed by adding a carbon oil having the same refractive index as the particle material to the particles in powder form and observing them under a microscope. In case of nonporous, homogeneous single-phase particles, the boundaries of the particles cannot be seen and, hence, the presence of the particles cannot be confirmed. However, the presence of the particles of the present invention can be confirmed in this manner, which clearly indicates that they are porous. It is believed that the inherent porosity of the particles and the presence of undulations in the particle surface imparts porosity to the undercoating layer of the thermal recording material and this prevent the transfer of heat energy from the thermal head to the substrate, resulting in an accumulation of heat energy in the color developing layer and hence an improvement in color developing sensitivity.

In contrast, confetti particles and homogeneous particles fail to give satisfactory high color density and thus differ markedly from the porous particles of the present fine-particle aggregate emulsion.

Thermal recording materials using the particles of the present fine-particle aggregate emulsion can be made in the following manner.

A composition for forming an undercoating layer is prepared by mixing the aforesaid fine-particle aggregate emulsion with a binder comprising an organic polymeric substance. This composition is applied to a substrate and then dried.

Useful substrates include paper, plastic sheets and the like. However, paper is usually used as the substrate.

Useful organic polymeric substances include, for example, water-soluble polymers such as polyvinyl alcohol, oxidized starch and hydroxyethyl cellulose; and emulsion latices such as styrene-butadiene rubber latex and acrylic emulsion.

The above-described fine-particle aggregate emulsion is usually used in an amount, on a dry basis, of 10 to 60 parts by weight per 100 parts by weight of the binder. If desired, inorganic pigments such as calcium carbonate, magnesium carbonate, talc and kaolin may be additionally used.

The undercoating layer usually has a dry film thickness of 5 to 15μ.

In the thermal recording layer composition applied onto the undercoating layer, a colorless basic dye such as a colorless fluoran, triarylmethane or phenothiazine dye is used as the color former, and a phenolic compound, an aromatic carboxylic acid or the like is used as the developer. The proportion of the color former to the developer in the thermal recording layer is such that 1 to 30 parts by weight of the developer is usually used for each part by weight of the color former. The combined amount of the color former and the developer is usually 100 parts by weight for 30 parts by weight of the binder.

As the binder, there may be used any of various organic polymeric substances that are used as binders for thermal recording materials. Useful organic polymeric substances include, for example, water-soluble polymers such as polyvinyl alcohol, oxidized starch and hydroxyethyl cellulose; synthetic rubber latex derived from styrene and butaidne; and acrylic emulsion.

The color former and developer used in the thermal recording layer of the present invention are separately wet-ground in the presence of a dispersion stabilizer, for example, by means of a ball mill or the like. Then, the resulting color former and developer dispersions, the aforesaid binder and other optional ingredients such as inorganic pigments (e.g., calcium carbonate, magnesium carbonate, talc and kaolin), ultraviolet absorbers (e.g., benzophenone and triazole compounds) and sensitizers (e.g., wax and fatty acid amides) are mixed and stirred vigorously to obtain a thermal recording layer composition.

The thermal recording layer composition is applied onto the undercoating layer so as to give a dry film thickness of about 2 to 10μ, and then dried.

The present invention is further illustrated by the following examples. In these examples, all parts and percentages are by weight.

EXAMPLE 1

As a first step, a separable flask fitted with a stirrer, a thermometer and a reflux condenser was charged with 100 parts of water and 0.05 part of sodium lauryl sulfate. The contents of the flask were heated to 70° C. with stirring under an atmosphere of nitrogen. While the internal temperature was maintained at 70° C., 0.8 part of potassium persulfate was added to the flask as a polymerization initiator. After the dissolution thereof was confirmed, a monomer mixture composed of 4 parts of methyl methacrylate, 4 parts of butyl acrylate and 2 parts of methacrylic acid was charged into the flask and polymerized for 2 hours.

After completion of the polymerization, the resulting copolymer emulsion was neutralized by adding thereto 1.6 parts of 28% aqueous ammonia (about 1.1 moles of ammonia per mole of methacrylic acid) and stirring this mixture well. Thus, there were obtained swollen seed particles.

On the other hand, a monomer emulsion for use in the second step was prepared by adding 85 parts of styrene and 5 parts by divinylbenzene to 50 parts of water and 0.5 part of sodium lauryl sulfate and stirring this mixture well. In the second step, reaction was carried out by injecting this vinyl monomer emulsion continuously to the above neutralized copolymer emulsion over a period of 4 hours. After completion of the injection, the polymerization mixture was aged for 3 hours.

The emulsion thus obtained had a solid content of about 40%, a viscosity of 65 centipoises as measured at 25° C. with a BM type viscometer (rotor No. 1; rotational speed 60 rpm), and a pH of 8.5. When measured by electron microscopy, its average particle diameter was 0.9μ and the particle diameter of polymeric component (b) present in the aggregate particles was 0.1–0.3μ.

EXAMPLES 2-7

Fine-particle aggregate emulsions were prepared in the same manner as described in Example 1, except that the amount of surface active agent, degree of neutralization, type of alkaline material, copolymer (a)/foreign polymer (b) ratio, monomer composition, amount of crosslinkable monomer and its type, and/or the amount of functional monomer and its type were altered as shown in Table 1.

COMPARATIVE EXAMPLE 1

In the first step, a copolymer emulsion was formed by using the same monomer composition as used in Example 1. However, this copolymer emulsion was not swollen by neutralization with an alkaline material. Using the unneutralized emulsion as seed particles, the second step was carried out by polymerizing monomers in the same composition and manner as described in Example 1.

The resulting emulsion had a pH of 2.2, a solid content of about 40%, a viscosity of 10 centipoises, and an average particle diameter of 0.9μ. However, the particles contained in this emulsion were not aggregates of finer particles as observed in the emulsion of Example 1, but confetti particles having angulations on the surface.

COMPARATIVE EXAMPLES 2-5

In Comparative Example 2, the procedure of Example 1 was repeated except that no unsaturated carboxylic acid monomer was used. In Comparative Example 3, the procedure of Example 6 was repeated except that the polymerization of the second step was carried out by using the same monomer composition as used in the first step. In Comparative Example 4, the procedure of Example 1 was repeated except that the amount of sodium lauryl sulfate used in the first step was greatly increased to reduce the particle size. In Comparative Example 5, the procedure of Example 1 was repeated except that the main monomers used in the first step were replaced by styrene. The monomer compositions of Comparative Examples 2-5 are shown in Table 1.

TABLE 1

| | Raw Materials | Example 1 | 2 | 3 | 4 | 5 | 6 | 7 |
|---|---|---|---|---|---|---|---|---|
| First-step polymerization | MMA | 4 | 5.5 | 8 | 4 | 3.5 | 8.5 | 4 |
| | ST | — | — | 2 | — | — | — | — |
| | BA | 4 | 4 | 6 | 4 | 4 | 1.0 | 4 |
| | MAC | 2 | 0.5 | 4 | 2 | 4 | 0.5 | 2 |
| | DVB | — | — | — | — | 0.5 | — | — |
| | NaLS | 0.05 | 0.05 | 0.05 | 0.3 | 0.05 | 0.05 | 0.01 |
| Neutralization | 28% aqueous ammonia | 1.6 | 0.4 | — | 2.9 | 3.2 | 0.4 | 1.6 |
| | NaOH | — | — | 0.25 | — | — | — | — |
| Second-step polymerization | ST | 85 | 85 | 78 | 82 | 78 | 75 | 85 |
| | MMA | — | — | — | — | 6 | — | — |
| | BA | — | — | — | 5 | — | — | — |
| | HEMA | — | — | — | — | 3 | — | — |
| | MAC | — | — | 2 | — | — | — | — |
| | DVB | 5 | 5 | — | — | 1 | 5 | 5 |
| | EGDM | — | — | — | 3 | — | — | — |
| | NaLS | 0.5 | 0.5 | 0.5 | 0.5 | 0.5 | 0.7 | 0.1 |
| | Non-volatiles | 40 | 40 | 40 | 40 | 39 | 39 | 40 |

TABLE 1-continued

| | | | | | | | |
|---|---|---|---|---|---|---|---|
| Viscosity | 65 | 50 | 35 | 90 | 100 | 75 | 60 |
| pH | 8.5 | 8.3 | 7.1 | 8.4 | 8.3 | 8.4 | 8.5 |
| Whole particle diameter | 0.9 | 0.85 | 0.95 | 0.35 | 0.8 | 1.0 | 1.5 |
| Particle diameter of component (b) | 0.1–0.2 | 0.2–0.3 | 0.1–0.2 | 0.1–0.2 | 0.1–0.2 | 0.2–0.3 | 0.1–0.2 |
| Shape | Fine-particle aggregate | Same as left | Same as left | Same as left | Same as left | Same as left | Same as left |

| | Raw Materials | Comparative Example | | | | |
|---|---|---|---|---|---|---|
| | | 1 | 2 | 3 | 4 | 5 |
| First-step polymerization | MMA | 4 | 6 | 8.5 | 4 | — |
| | ST | — | — | — | — | 8 |
| | BA | 4 | 4 | 1.0 | 4 | — |
| | MAC | 2 | — | 0.5 | 2 | 2 |
| | DVB | — | — | — | — | — |
| | NaLS | 0.05 | 0.05 | 0.05 | 2.0 | 0.05 |
| Neutralization | 28% aqueous ammonia | 0 | 0.2 | 0.4 | 1.6 | 1.6 |
| | NaOH | — | — | — | — | — |
| Second-step polymerization | ST | 85 | 85 | — | 85 | 85 |
| | MMA | — | — | 76.5 | — | — |
| | BA | — | — | 9 | — | — |
| | HEMA | — | — | — | — | — |
| | MAC | — | — | 4.5 | — | — |
| | DVB | 5 | 5 | — | 5 | 5 |
| | EGDM | — | — | — | — | — |
| | NaLS | 0.5 | 0.5 | 0.5 | 1.0 | 0.5 |
| | Non-volatiles | 40 | 40 | 40 | 40 | 40 |
| | Viscosity | 10 | 20 | 50 | 140 | 55 |
| | pH | 2.2 | 8.0 | 8.5 | 8.5 | 8.5 |
| | Whole particle diameter | 0.9 | 0.85 | 0.85 | 0.1 | 0.85 |
| | Particle diameter of component (b) | — | — | — | — | — |
| | Shape | Confetti particle | Homogeneous particle | Same as left | Same as left | Same as left |

(Note)
MMA = methyl methacrylate; ST = styrene; BA = butyl acrylate; MAC = methacrylic acid; HEMA = 2-hydroxyethyl methacrylate; DVB = divinylbenzene; EGDM = ethylene glycol dimethyacrylate; NaLS = sodium layryl sulfate.

APPLICATION EXAMPLE 1 (USE IN PAINTS)

In a paint formulation, each of the fine particle emulsions obtained in Examples 1–7 and Comparative Examples 1–4 was used as an organic pigment, in place of a part of the rutile titanium dioxide. As the paint vehicle, there was used Almatex E-208 that is an acrylic emulsion having a solid resin content of 45%.

The paint formulation employed was as follows.

| Ingredient | Parts |
|---|---|
| Water | 45.0 |
| 25% aqueous solution of Tamol 731 (a dispersant manufactured by Rohm and Haas Co.) | 12.2 |
| Ethylene glycol | 40.0 |
| 2-Amino-2-methylpropanol | 3.0 |
| Nopco DF-122NS (an anti-foaming agent manufactured by Sun Nopco Co.) | 0.8 |
| Rutile titanium dioxide | 164.5 |
| Fine particle emulsion (40%) | 102.8 |
| Almatex E-208 (an acrylic emulsion: manufactured by Mitsui-Toatsu Chemicals Co.) | 676.0 |
| Solvent mixture composed of 1 part of ethylene glycol monobutyl ether and 2 parts of CS-12 (a film-forming agent manufactured by Chisso) | 40.0 |
| Mixture composed of 1 part of hydroxyethyl cellulose and 10 parts of propylene glycol | 12.4 |

The paint had a solids content of 46.9%, a pigment content of 40.0% by weight based on the solid matter contained therein, and a viscosity of 70–80 KU.

Paints were prepared by charging water, Tamol 731, ethylene glycol, 2-amino-2-methylpropanol, Nopco DF-122NS and rutile titanium dioxide into a pigment dispersion mill and grinding them well. Then, each of the fine particle emulsions obtained in the foregoing examples and comparative examples, Almatex E-208, butyl cellosolve/Texanol and hydroxyethyl cellulose/-propylene glycol were added the above dispersion, followed by vigorous stirring. Finally, the viscosity of the paint was adjusted to 70–80 KU with the aid of a Stormer viscometer.

The paints so prepared were applied to slates so as to give a dry film thickness of about 40μ, and dried at room temperature for one week. Then, their performance was evaluated.

Hiding power was evaluated as follows. Using an applicator, a paint to be tested is applied to a sheet of hiding power test paper (manufactured by Japan Test Panel Industrial Co.) so as to give a dry film thickness of 75μ, and dried at room temperature for one week. Then, its hiding power was calculated from the 45°/0° reflectance ratio.

The results thus obtained are shown in Table 2.

(Evaluation Procedures)

Gloss: Measured at an angle of 60° with a glossmeter (manufactured by Suga Testing Machine Co.).

Hiding power: Evaluated according to JIS K-5663.

Water resistance: Evaluated according to JIS K-5663 and judged to be good ○ when no abnormalities such as blistering and loss in gloss are observed.

Alkali resistance: Same as above.

Weather resistance: Judged to be good ○ when no abnormalities such as blistering, whitening and loss in gloss are observed after irradiation in a weather meter for 500 hours.

Washability: Evaluated according to JIS K-5663. Judged to be good ○ when the paint film does not peel off even after being washed more than 2,000 times, and fair (Δ) when the paint film peels off after being washed 1,000-2,000 times.

Adherence: Judged to be good ○ when the paint film is not stripped at a crosscut, and fair (Δ) when the paint film is slightly stripped at a crosscut.

Coating colors were prepared by adding the dispersant Aron T-40 with a solid content of 40% to water, dispersing Kaolin Clay UM-90 thereinto well by means of a Kaules mixer, and then adding thereto each of the aforesaid copolymer emulsions as an organic pigment. For purposes of comparison, Titanium Dioxide Paste with a solid content of 62% (manufactured by Dainichi Seika K.K.) was used as an inorganic pigment, and Precipitated Calcium Carbonate Slurry TP-222HS with a solid content of 60% (manufactured by Okutama Industrial Co.) as an inorganic filler. Finally, Phosphated Starch MS-4600 and Polylac 755 with a solid content of 50% were added as binders to obtain coating colors.

Using an applicator, each of the aforesaid coating colors was applied to wood free paper so as to give a dry pickup of about 14-15 g/m² and then dried at 120°

TABLE 2

| Application Example No. | Fine particle emulsion | TiO₂/fine particles | Gloss | Hiding power (%) | Water resistance | Alkali resistance | Weather resistance | Washability | Adherence |
|---|---|---|---|---|---|---|---|---|---|
| 1-1 | Example 1 | 80/20 | 88 | 97 | ○ | ○ | ○ | ○ | ○ |
| 1-2 | Example 2 | " | 86 | 98 | ○ | ○ | ○ | ○ | ○ |
| 1-3 | Example 3 | " | 89 | 97 | ○ | ○ | ○ | ○ | ○ |
| 1-4 | Example 4 | " | 90 | 97 | Δ | ○ | ○ | ○ | ○ |
| 1-5 | Example 5 | " | 89 | 98 | ○ | ○ | ○ | ○ | ○ |
| 1-6 | Example 6 | " | 89 | 97 | ○ | ○ | ○ | ○ | ○ |
| 1-7 | Example 7 | " | 84 | 96 | ○ | ○ | ○ | ○ | ○ |
| 1-8 | Comparative Example 1 | " | 82 | 90 | ○ | ○ | ○ | ○ | ○ |
| 1-9 | Comparative Example 2 | " | 81 | 91 | ○ | ○ | ○ | ○ | ○ |
| 1-10 | Comparative Example 3 | " | 83 | 91 | Δ | ○ | Δ | Δ | ○ |
| 1-11 | Comparative Example 4 | " | 90 | 89 | X | X | Δ | X | Δ |
| 1-12 | Example 1 | 100/0 | 87 | 99 | ○ | ○ | ○ | ○ | ○ |

APPLICATION EXAMPLE 2 (USE IN PAPER COATING)

The performance of the fine particle emulsions obtained in Examples 1-7 Comparative Examples 1-4 was evaluated by using each of them as an organic pigment or filler in a paper coating fluid.

The formulation and the evaluation procedures were as follows.

(Formulation)

| Ingredient | Parts |
|---|---|
| UW-90 (manufactured by EMC Co.) | 90 |
| Pigment or filler | 10 |
| Aron T-40 (a dispersant manufactured by TOAGOSEI CHEMICAL INDUSTRY) | 0.09 |
| MS-4600 (Manufactured by Nippon Food Industrial Co.) | 3 |
| Polylac 755 (SBR latex: manufactured by Mitsui-Toatsu Chemicals Co.) | 12 |

(The solid content of the coating composition was 62%.)

C. for 20 seconds. Thereafter, using such conditions as a roll temperature of 60° C., a linear pressure of 100 kg/cm and a speed of 10 m/min, the paper was passed twice through calender rolls to obtain coated paper, and its performance was evaluated.

The results thus obtained are shown in Table 3.

(Evaluation Procedures)

Color viscosity: Measured with a BM type viscometer (60 rpm; No. 4 rotor).

Gloss: 75° reflectance is measured according to JIS P-8142.

Printed gloss: Using an RI printing tester, paper is printed with 0.4 cc of New Bright Indigo (manufactured by Toyo Ink Co.). After drying, its 75° reflectance is measured according to JIS P-8142.

Brightness: Measured with a Hunter brightness meter according to JIS P-8123.

Opacity: Measured according to JIS P-8138.

Dry pick: Tested with an RI printing tester on the basis of 10 points.

Wet pick: Tested with an RI printing tester on the basis of 10 points.

TABLE 3

| Application Example No. | Pigment or filler | Color viscosity (cP) | Gloss | Printed gloss paper | Brightness | Opacity | Dry pick | Wet pick |
|---|---|---|---|---|---|---|---|---|
| 2-1 | Example 1 | 1830 | 76.9 | 93.0 | 80.5 | 95.9 | 8 | 9 |
| 2-2 | Example 2 | 1760 | 77.4 | 93.2 | 80.7 | 95.8 | 8 | 9 |
| 2-3 | Example 3 | 1900 | 76.0 | 92.8 | 80.3 | 95.8 | 7 | 8 |
| 2-4 | Example 4 | 1990 | 79.2 | 93.3 | 80.0 | 95.1 | 8 | 9 |
| 2-5 | Example 5 | 2010 | 77.1 | 92.9 | 80.7 | 95.4 | 8 | 9 |
| 2-6 | Example 6 | 1930 | 76.5 | 92.9 | 80.5 | 95.4 | 8 | 9 |
| 2-7 | Example 7 | 1830 | 75.9 | 92.4 | 80.4 | 95.2 | 8 | 9 |

TABLE 3-continued

| Application Example No. | Pigment or filler | Color viscosity (cP) | Gloss | Printed gloss paper | Brightness | Opacity | Dry pick | Wet pick |
| --- | --- | --- | --- | --- | --- | --- | --- | --- |
| 2-8 | Comparative Example 1 | 1370 | 75.2 | 90.2 | 79.1 | 94.1 | 7 | 8 |
| 2-9 | Comparative Example 2 | 1400 | 75.5 | 90.1 | 79.0 | 94.0 | 7 | 8 |
| 2-10 | Comparative Example 3 | 1480 | 75.5 | 89.9 | 79.1 | 94.0 | 7 | 8 |
| 2-11 | Comparative Example 4 | 1560 | 77.1 | 92.0 | 78.5 | 93.9 | 6 | 7 |
| 2-12 | Titanium dioxide | 1820 | 71.3 | 88.7 | 81.9 | 97.1 | 8 | 9 |
| 2-13 | Calcium carbonate | 1220 | 69.8 | 88.3 | 77.5 | 93.9 | 8 | 9 |

APPLICATION EXAMPLE 3 (USE IN THERMAL RECORDING PAPER)

i) Preparation of Undercoating Compositions

Using some of the fine particle emulsions obtained in the foregoing examples and comparative examples, undercoating compositions for thermal recording paper were prepared by mixing the following ingredients and stirring the mixture vigorously.

| Ingredient | Solid content | Parts by weight |
| --- | --- | --- |
| Fine particle emulsion | 40% | 25 |
| Bonron S-1120 (an acrylic emulsion manufactured by Mitsui-Toatsu Chemicals Co.) | 45% | 70 |
| Carbital 90 (a calcium carbonate dispersion manufactured by Japan IPC Co.) | 73% | 5 | ii) Preparation of Thermal Recording Layer Compositions

Using a sand mill, fluid A (a color former dispersion) and fluid B (a developer dispersion) were separately prepared according to the following formulations.

| (Fluid A) | |
| --- | --- |
| Ingredient | Parts by weight |
| 3-Diethylamino-6-methyl-7-anilino-fluoran | 20 |
| 20% aqueous solution of hydroxyethyl cellulose | 5 |
| Water | 75 |

| (Fluid B) | |
| --- | --- |
| Ingredient | Parts by weight |
| Bisphenol A | 20 |
| 20% aqueous solution of hydroxyethyl cellulose | 5 |
| Petrolite R-50 (a microcrystalline wax manufactured by Halico) | 5 |
| Water | 70 |

After fluids A and B were thoroughly dispersed in a sand mill, 15 parts by weight of fluid A, 40 parts by weight of fluid B, 20 parts by weight of calcium carbonate, and 25 parts by weight of a 20% aqueous solution of Polyvinyl Alcohol K-117 (manufactured by Kurare) were mixed and stirred vigorously to obtain a thermal recording layer composition.

Using a bar coater, each of the aforesaid undercoating compositions was applied to commercially available wood free paper (having an areal weight of about 50 g/m$^2$) so as to give a dry pickup of 15 g/m$^2$, and then dried. Subsequently, using a bar coater, the aforesaid thermal recording layer composition was applied thereto so as to give a dry pickup of about 15 g/m$^2$, and then dried to obtain a thermal recording material. For purpose of comparison, an undercoating composition was prepared by replacing the total amount of fine particle emulsion by calcium carbonate, and applied in the same manner to obtain a thermal recording material (Comparative Example 6 shown in Table 4).

The thermal recording papers thus obtained were printed with a thermal fascimile receiver (COPIX 6500; manufactured by Toshiba) and their print densities were measured with a Macbeth densitometer. The results obtained are shown in Table 4.

TABLE 4

| Fine particle emulsion used | | Print density |
| --- | --- | --- |
| Example No. | Shape | |
| Example 1 | Fine-particle aggregate | 1.25 |
| Example 3 | " | 1.20 |
| Example 4 | " | 1.20 |
| Example 5 | " | 1.25 |
| Example 7 | " | 1.0 |
| Comparative Example 1 | Confetti particle | 1.0 |
| Comparative Example 2 | Homogeneous particle | 1.0 |
| Comparative Example 5 | " | 1.0 |
| Comparative Example 6 | Calcium carbonate alone | 0.9 |

As can be seen from Table 4, the thermal recording papers using a fine-particle aggregate emulsion as a filler were found to give higher print densities than those using a confetti particle emulsion, a homogeneous particle emulsion or an inorganic compound (i.e., calcium carbonate).

What is claimed is:

1. A thermal recording material comprising a substrate and a color developing layer containing a color former and a developer capable of producing a color by contact therewith, wherein an undercoating layer containing the particles of a fine-particle aggregate emulsion is disposed between the substrate and the color developing layer, and wherein the aggregate particles have a diameter of 0.2 to 3.0μ and are formed from 0.5 to 90 parts by weight of a copolymer (a) composed of 1 to 50 parts by weight of a unsaturated carboxylic acid and 99 to 50 parts by weight of a vinyl monomer copolymerizable therewith, and 99.5 to 10 parts by weight of another polymer (b) of at least one vinyl monomer differing in composition from that of copolymer (a), said polymer (b) having a glass transition temperature of 50° C. or above and being present inhomogeneously with copolymer (a) in each aggregate particle in the form of a plurality of fine particles having a diameter 0.05 to 0.5μ.

2. The thermal recording material of claim 1, wherein the fine-particle aggregate emulsion is produced by a process which comprises the steps of forming a copolymer (a) by emulsion polymerization of 1 to 50 parts by weight of an unsaturated carboxylic acid and 99 to 50 parts by weight of a vinyl monomer copolymerizable therewith; neutralizing the resulting copolymer emulsion with an alkaline substance in an amount of 0.3 to 3.0 moles per mole of the carboxylic acid used therein; adding to the neutralized emulsion a vinyl monomer differing in composition from that used in copolymer (a), in an amount of 99.5 to 10 parts by weight of 0.5 to 90 parts by weight of the solid component of the neutralized emulsion; and subjecting the resulting mixture to emulsion polymerization while using the neutralized emulsion as seed particles.

3. The thermal recording material of claim 2 wherein the unsaturated carboxylic acid employed to produce the emulsion is selected from the group consisting of unsaturated monobasic acids, unsaturated dibasic acids and monoesters thereof.

4. The thermal recording material of claim 2 wherein the unsaturated carboxylic acid employed to produce the emulsion is selected from the group consisting of unsaturated monobasic acids, unsaturated dibasic acids and monoesters thereof.

5. The thermal recording material of claim 2 wherein the unsaturated carboxylic acid employed to produce the emulsion is used in an amount of 1 to 50 parts by weight.

6. The thermal recording material of claim 2 wherein the vinyl monomer employed to produce the emulsion is used in an amount of 1 to 50 parts by weight.

7. The thermal recording material of claim 2 wherein the vinyl monomer employed to produce the emulsion is selected from the group consisting of styrene α-methylstyrene, vinyltoluene, methyl methacrylate, ethyl (meth)acrylate, butyl (meth)acrylate, vinyl acetate, vinyl propionate, (meth)acrylonitrile, vinyl chloride and vinylidene chloride.

8. The thermal recording material of claim 2 wherein the glass transition temperature of the copolymer (a) employed to produce the emulsion is not higher than 90° C.

9. The thermal recording material of claim 2 wherein the alkaline substance employed to produce the emulsion is an inorganic alkaline material, a volatile alkaline material or an organic alkaline material.

10. The thermal recording material of claim 2 wherein the alkaline substance employed to produce the emulsion is selected from the group consisting of potassium hydroxide, sodium hydroxide, calcium hydroxide, sodium silicate, aqueous ammonia, dimethylethanolamine, triethylamine, triethanolamine and morpholine.

11. The thermal recording material of claim 2 wherein the emulsion polymerization employed to produce the emulsion is carried out in the presence of an anionic surface active agent or an nonionic surface active agent.

12. The thermal recording material of claim 11 wherein the surface active agent employed to produce the emulsion is sued in an amount of 0.1 to 10 parts by weight per 100 parts by weight of the total monomers used.

13. The thermal recording material of claim 2 wherein the emulsion polymerization employed to produce the emulsion is carried out in the presence of a polymerization initiator comprising a persulfate, an organic peroxide or an azo compound.

14. The thermal recording material of claim 2 wherein the polymerization initiator employed to produce the emulsion is selected from the group consisting of potassium persulfate, sodium persulfate, ammonium persulfate, benzoyl peroxide and azobisisobutyronitrile.

15. The thermal recording material of claim 2 wherein the emulsion polymerization employed to produce the emulsion is carried out at a temperature in the range of 20° to 90° C.

16. The thermal recording material of claim 2 wherein a crosslinkable monomer employed to produce the emulsion is additionally used in the emulsion polymerization system.

17. The thermal recording material of claim 1 wherein the unsaturated carboxylic acid of the emulsion is selected from the group consisting of acrylic acid, methacrylic acid, crotonic acid, itaconic acid, fumaric acid and maleic acid.

18. The thermal recording material of claim 1, wherein the vinyl monomer employed to produce copolymer (a) of the emulsion and the vinyl monomer employed to produce polymer (b) each is selected from the group consisting of aromatic vinyl compounds, acrylic esters, vinyl cyano compounds, an halogenated vinyl compounds.

19. The thermal recording material of claim 1, wherein copolymer (a) of the emulsion is produced from methacrylic acid, methyl methacrylate, and at least one of styrene, butyl acrylate, and divinyl benzene, and polymer (b) is produced from styrene and at least one of methyl methacrylate, butyl acrylate, methacrylic acid, divinyl benzene, and ethylene glycol dimethylacrylate.

* * * * *